United States Patent
Nägelkrämer et al.

(10) Patent No.: US 10,707,793 B2
(45) Date of Patent: Jul. 7, 2020

(54) METHOD AND APPARATUS FOR OPERATING A SYNCHRONOUS MACHINE HAVING A PERMANENT-MAGNET ROTOR

(71) Applicant: Dr. Ing. h.c. F. Porsche Aktiengesellschaft, Stuttgart (DE)

(72) Inventors: Jan Nägelkrämer, Stuttgart (DE); Axel Heitmann, Ditzingen (DE); Thomas Hubert, Leonberg (DE); Sven Luthardt, Sindelfingen (DE); Stefan Schmitz, Vaihingen/Enz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 13 days.

(21) Appl. No.: 15/979,763

(22) Filed: May 15, 2018

(65) Prior Publication Data
US 2019/0356254 A1 Nov. 21, 2019

(30) Foreign Application Priority Data
Jun. 6, 2017 (DE) ........................ 10 2017 112 388

(51) Int. Cl.
*H02P 21/00* (2016.01)
*H02P 21/22* (2016.01)
(Continued)

(52) U.S. Cl.
CPC .......... *H02P 21/0017* (2013.01); *G06F 30/23* (2020.01); *H02P 21/22* (2016.02); *G06F 2111/10* (2020.01)

(58) Field of Classification Search
USPC ...................................... 318/400.2
See application file for complete search history.

(56) References Cited

U.S. PATENT DOCUMENTS 6,605,912 B1 8/2003 Bharadwaj et al.
8,698,434 B2 4/2014 Akasako
(Continued)

FOREIGN PATENT DOCUMENTS

CN 104319969 A 1/2015
DE 102011009935 A1 12/2011
(Continued)

OTHER PUBLICATIONS

German Search Report for German Application No. 10 2017 112 388.1, dated Aug. 31, 2017, including partial English translation—8 pages.
(Continued)

*Primary Examiner* — Jorge L Carrasquillo
(74) *Attorney, Agent, or Firm* — Ratner Prestia

(57) ABSTRACT

A method for operating a synchronous machine having a rotor, comprising the following features: the synchronous machine is modelled, with respect to the rotor, as a two-phase system with a direct-axis current and a quadrature-axis current, rotor losses of the synchronous machine, which rotor losses occur in the rotor, are numerically described by an evaluation function of the first direct-axis current, of the quadrature-axis current and of a specified rotation speed of the synchronous machine, and, on the basis of the evaluation function, the direct-axis current and the second quadrature-axis current are controlled for the specified rotation speed and a required torque in such a way that the synchronous machine outputs the required torque and the rotor losses are low and a corresponding synchronous machine, a corresponding computer program and a corresponding storage medium.

1 Claim, 1 Drawing Sheet

---

Method 10, e.g., implemented in Computer Program of Motor Controller to Control Synchronous Machine (e.g., Electric Motor) 20 of FIG. 2

11: Model the synchronous machine (e.g., electric motor) (20), with respect to a rotor, as a two-phase system with a direct-axis current ($i_d$) and a quadrature-axis current ($i_q$).

12: Numerically describe rotor losses in the rotor of the synchronous machine (20) by executing a numerical simulation of the synchronous machine (20), on the basis of which an evaluation function is determined, and is carried out by a finite element method (FEM).

13: Control, the direct-axis current ($i_d$) and the quadrature-axis current ($i_q$) on the basis of the evaluation function for a specified rotation speed and a required torque such that the synchronous machine (20) outputs the required torque and the rotor losses are minimized.

(51) Int. Cl.
*G06F 17/50* (2006.01)
*G06F 30/23* (2020.01)
*G06F 111/10* (2020.01)

(56) References Cited

U.S. PATENT DOCUMENTS

| | | |
|---|---|---|
| 8,829,830 B2 | 9/2014 | Kobayashi et al. |
| 2005/0073280 A1 | 4/2005 | Yoshinaga et al. |
| 2013/0006593 A1 | 1/2013 | Uehara |
| 2013/0088179 A1* | 4/2013 | Kobayashi ............ H02P 21/141 318/400.02 |
| 2013/0093371 A1 | 4/2013 | Akasako |
| 2013/0119900 A1 | 5/2013 | Xiang et al. |
| 2013/0207589 A1 | 8/2013 | Margner et al. |
| 2016/0028343 A1 | 1/2016 | Choi et al. |

FOREIGN PATENT DOCUMENTS

| | | |
|---|---|---|
| DE | 102010050344 A1 | 5/2012 |
| DE | 102012019504 A1 | 4/2013 |
| JP | 09191700 A * | 7/1997 |
| JP | 09191700 A | 7/1997 |
| JP | 2013085377 A | 5/2013 |
| JP | 2016110396 A * | 6/2016 |
| JP | 2016110396 A | 6/2016 |
| WO | 2004073156 A1 | 8/2004 |
| WO | 2011124346 A2 | 10/2011 |

OTHER PUBLICATIONS

Japanese Notification of Reason for Rejection for Japanese Application No. 2018-104353, dated Apr. 12, 2019, 4 pages.
Indian Examination Report for Indian Application No. 201814016951, dated Mar. 16, 2020, with translation, 6 pages.

* cited by examiner

FIG. 1

Method 10, e.g., implemented in Computer Program of Motor Controller to Control Synchronous Machine (e.g., Electric Motor) 20 of FIG. 2

11
Model the synchronous machine (e.g., electric motor) (20), with respect to a rotor, as a two-phase system with a direct-axis current ($i_d$) and a quadrature-axis current ($i_q$).

12
Numerically describe rotor losses in the rotor of the synchronous machine (20) by executing a numerical simulation of the synchronous machine (20), on the basis of which an evaluation function is determined, and is carried out by a finite element method (FEM).

13
Control, the direct-axis current ($i_d$) and the quadrature-axis current ($i_q$) on the basis of the evaluation function for a specified rotation speed and a required torque such that the synchronous machine (20) outputs the required torque and the rotor losses are minimized.

FIG. 2

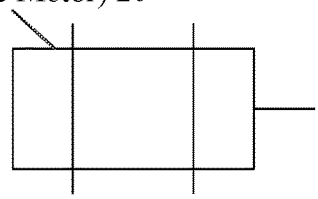
Synchronous Machine (e.g., Electric Motor) 20

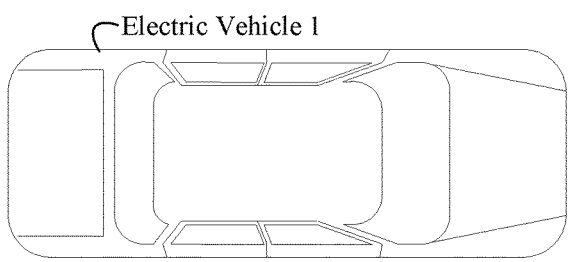
Electric Vehicle 1

METHOD AND APPARATUS FOR OPERATING A SYNCHRONOUS MACHINE HAVING A PERMANENT-MAGNET ROTOR

CROSS-REFERENCE TO RELATED APPLICATIONS

This application claims priority to German Patent Application No. DE 10 2017 112 388.1, filed Jun. 6, 2017, which is incorporated by reference herein in its entirety.

FIELD OF THE INVENTION

The present invention relates to a method for operating a synchronous machine having a permanent-magnet rotor. The present invention furthermore relates to a corresponding synchronous machine, to a corresponding computer program and to a corresponding storage medium.

BACKGROUND OF THE INVENTION

In power electronics and electrical engineering, control concepts in which sinusoidal alternating variables—or alternating variables which are assumed to be largely sinusoidal—such as voltages or currents cannot be controlled directly in respect of their instantaneous time value but rather in respect of an instantaneous value which is corrected by the phase angle within the periods, in summary called field-oriented or vector control. To this end, the detected alternating variables are each transferred into a coordinate system which rotates at the frequency of the alternating variables. Identical variables, to which all customary methods of control engineering can be related, are then produced from the alternating variables within this rotating coordinate system.

For practical reasons, a Cartesian coordinate system comprising two axes d and q which are perpendicular to one another is generally selected, in particular for field-oriented control of synchronous machines. Therefore, the actuation signals for a three-phase four-quadrant actuator are formed by way of space vector modulation (space vector pulse width modulation, SVPWM) on the basis of suitable reference values for the corresponding current components.

In order to achieve a required torque, different combinations of the two phase currents $i_d$ and $i_q$ generally come into consideration. In this case, that combination with the lowest phase current and therefore maximum torque per ampere (MTPA) is often selected in practice. In this way, the copper losses of the machine which occur primarily in the stator should be largely minimized.

CN104319969, which is incorporated by reference herein, and US2013207589, which is incorporated by reference herein, disclose control methods for an electrical machine, in particular a permanent-magnet synchronous machine for electric and hybrid vehicles, in which methods the currents $i_d$ and $i_q$ are analyzed and eddy current and hysteresis losses are minimized.

DE102010050344, which is incorporated by reference herein, discloses a control method for an electrical machine in which iron losses are generally calculated.

US2005073280, which is incorporated by reference herein, US2013006593, which is incorporated by reference herein, US2013119900, which is incorporated by reference herein, WO04073156, which is incorporated by reference herein, US2016028343, which is incorporated by reference herein, and U.S. Pat. No. 6,605,912, which is incorporated by reference herein, disclose further control methods in which magnetic noise is partially reduced and the torque ripple is compensated for.

SUMMARY OF THE INVENTION

The invention provides a method for operating a synchronous machine having a permanent-magnet rotor, a corresponding synchronous machine, a corresponding computer program and a corresponding storage medium as claimed in the independent claims.

In this case, the method according to aspects of the invention is based on the finding that the rotor often becomes too hot for constant powers in very powerful machines. In permanent-magnet synchronous machines, a rotor of this kind comprises sheet metal (iron) and magnets; therefore, the rotor losses are made up substantially of iron losses and magnet losses.

Therefore, a combination of the two phase currents $i_d$ and $i_q$, which does not necessarily minimize the copper losses, but rather the hysteresis losses, in order to relieve the rotor of loading is selected for the purpose of achieving a required torque.

It is therefore proposed, in accordance with the—two- or three-dimensional—finite element method (FEM), to calculate the magnetic and iron losses depending on $i_d$, $i_q$ and the rotation speed. Since the rotor constitutes the critical component in respect of heat dissipation and therefore continuous power of the synchronous machine, a combination of $i_d$ and $i_q$ which minimizes losses can be found. Overshooting of the minimum phase current in the sense of the MTPA approach has to be accepted in the process.

One advantage of the proposed solution is therefore the improved constant power of a machine which is driven according to aspects of the invention. Further advantageous refinements of the invention are specified in the dependent claims.

BRIEF DESCRIPTION OF THE DRAWINGS

An exemplary embodiment of the invention is illustrated in the drawings and will be described in greater detail below.

FIG. 1 shows a flowchart of a method according to aspects of the invention.

FIG. 2 schematically shows a motor which is controlled according to aspects of the invention.

DETAILED DESCRIPTION OF THE INVENTION

FIG. 1 illustrates a method (10) to reduce the development of heat during continuous operation of a synchronous machine (20), such as an electric motor, having a permanent-magnet rotor. To this end, a 2D or 3D numerical simulation of the synchronous machine (20) is carried out.

Using a two-phase system model (block 11) used as part of field-oriented control as a basis, iron and magnetic losses which occur in a rotor of the synchronous machine (20) can be numerically approximated (block 12) as a function of a first phase current, of a second phase current, and of a specified rotation speed of the synchronous machine (20) on the basis of the results of the numerical simulation. The function obtained in this way can serve as an evaluation function as part of an optimization problem which—for the specified rotation speed and a required torque—seeks to minimize rotor losses of the rotor by selecting an optimum combination of the two phase currents: direct-axis current ($i_d$) and quadrature-axis current ($i_q$). The combination of the direct-axis current ($i_d$) and the quadrature-axis current ($i_q$), which minimizes the rotor losses is found by solving the optimization problem and is used for controlling (block 13), for example, the electric motor (20) of an electric vehicle (1) as illustrated in FIG. 2.

More specifically, FIG. 1 depicts a method (10) for operating a synchronous machine, such as an electric motor (20), of an electric vehicle (1). The electric motor (20) includes a rotor. Beginning in block (11), the method (10) includes modeling the synchronous machine (e.g., electric motor) 20, with respect to the rotor, as a two-phase system with a direct-axis current ($i_d$) and a quadrature-axis current ($i_q$).

Continuing to block (12), the method (10) further includes numerically describing rotor losses in the rotor of the synchronous machine (20). Block (12) implements an evaluation function of the direct-axis current ($i_d$), of the quadrature-axis current ($i_q$), and of a specified rotation speed of the synchronous machine (20). For example, block (12) can include executing a numerical simulation of the synchronous machine (20), on the basis of which the evaluation function is determined, and is carried out by implementing a finite element method (FEM) in the numerical simulation. The evaluation function can be calculated by derating during operation of the synchronous machine (20), or the evaluation function can be prespecified. In block (12), the FEM of the numerical simulation can be performed in a two-dimensional (2D) manner or a three-dimensional (3D) manner. Alternatively or additionally, the numerical simulation of block (12) can be performed in an analytical manner.

The electric motor of the electric vehicle (1) can further include a stator. Accordingly, iron losses and magnetic losses in the rotor and copper losses and iron losses in the stator are calculated on the basis of the numerical simulation. The evaluation function is determined on the basis of the iron losses, the copper losses, and the magnetic losses.

Finishing in block (13), the method (1) further includes controlling, the direct-axis current ($i_d$) and the quadrature-axis current ($i_q$) on the basis of the evaluation function for the specified rotation speed and a required torque such that the synchronous machine (20) outputs the required torque and the rotor losses are minimized.

The synchronous machine (20) is thus designed to be operated in accordance with the method 10.

The method (10) of FIG. 1 can be implemented, for example, using software or hardware or in a mixed form comprising software and hardware, for example in a motor controller. Hence, the motor controller can include a machine-readable storage medium including a program, a processor, and execution of the computer program by the processor causes the motor controller to implement the blocks of FIG. 1. First, in block (11), the motor controller models a rotor of the electric motor (20) as a two-phase system with varying direct-axis currents ($i_d$) and varying quadrature-axis currents ($i_q$).

Second, in block (12), for a specified rotation speed of the rotor, the motor controller determines an optimum combination of a direct-axis current ($i_d$) and a quadrature axis-current ($i_q$) by executing a numerical simulation. The numeral simulation includes a two-dimensional or a three-dimensional final element method (FEM) that: receives as input: (i) the varying direct-axis currents, and (ii) the varying quadrature-axis currents, and calculates and outputs the optimum combination of the direct-axis current ($i_d$) and the quadrature axis-current ($i_q$) to obtain a minimal set of iron and magnetic losses in the rotor of the electric motor (20) at the specified rotation speed of the electric motor (20). In block (12), the two-dimensional or the three-dimensional FEM calculates and outputs the optimum combination of the direct-axis current ($i_d$) and the quadrature axis-current ($i_q$) based on derating during operation of the electric motor (20).

Third, as in block (13), the motor controller controls, the specified rotation speed of the rotor on the basis of the optimum combination of the direct-axis current ($i_d$) and the quadrature axis-current ($i_q$) for the specified rotation speed to obtain the minimal set of iron and magnetic losses in the rotor of the electric motor (20).

In some examples, the electric motor (20) further includes a stator. Execution of the computer program by the processor causes the motor controller to: execute the two-dimensional or the three-dimensional FEM of the numeral simulation in block (12) to calculate and output the optimum combination of the direct-axis current ($i_d$) and the quadrature axis-current ($i_q$) to further obtain a minimal set of copper and iron losses in the stator at the specified rotation speed of the electric motor (20). Execution of the computer program by the processor causes the motor controller to: further control in block (13), the specified rotation speed of the rotor on the basis of the optimum combination of the direct-axis current ($i_d$) and the quadrature axis-current ($i_q$) for the specified rotation speed to further obtain the minimal set of copper and iron losses in the stator.

What is claimed is:

1. A motor controller for operating an electric motor of an electric vehicle, the motor controller comprising:
   a machine-readable storage medium including a computer program;
   a processor;
   wherein execution of the computer program by the processor causes the motor controller to:
   model a rotor and a stator of the electric motor as a two-phase system with varying direct-axis currents and varying quadrature-axis currents;
   for a specified rotation speed of the rotor, determine an optimum combination of a direct-axis current and a quadrature axis-current by executing a numerical simulation, wherein the numeral simulation includes a two-dimensional or a three-dimensional final element method (FEM) that:
      receives as input: (i) the varying direct-axis currents, and (ii) the varying quadrature-axis currents, and
      calculates and outputs the optimum combination of the direct-axis current and the quadrature axis-current based on derating during operation of the electric motor to: (i) obtain a minimal set of iron and magnetic losses in the rotor of the electric motor at the specified rotation speed of the electric motor, and (ii) further obtain a minimal set of copper and iron losses in the stator at the specified rotation speed of the electric motor; and
   control, the specified rotation speed of the rotor on the basis of the optimum combination of the direct-axis current and the quadrature axis-current for the specified rotation speed to: (i) obtain the minimal set of iron and magnetic losses in the rotor of the electric motor, and (ii) the minimal set of copper and iron losses in the stator.

* * * * *